United States Patent [19]

Arrazola et al.

[11] 4,387,964
[45] Jun. 14, 1983

[54] ELECTRON ADDRESSED LIQUID CRYSTAL LIGHT VALVE

[75] Inventors: Ignacio M. Arrazola, Kirkwood; Raymond E. Brown, Florissant; Homer E. Dillard, Bridgeton, all of Mo.

[73] Assignee: McDonnell Douglas Corporation, St. Louis, Mo.

[21] Appl. No.: 199,292

[22] Filed: Oct. 21, 1980

[51] Int. Cl.³ .............................................. G02F 1/13
[52] U.S. Cl. ................................ 350/331 R; 350/334; 350/338
[58] Field of Search .................... 350/331 R, 334, 337, 350/338, 345, 351

[56] References Cited

U.S. PATENT DOCUMENTS

| | | |
|---|---|---|
| 3,711,713 | 1/1973 | Wysocki et al. |
| 4,012,119 | 3/1977 | Adams et al. ............... 350/338 |
| 4,060,316 | 11/1977 | Pollack et al. ............... 350/342 X |
| 4,315,258 | 2/1982 | McKnight et al. ............ 350/338 X |

Primary Examiner—John K. Corbin
Assistant Examiner—Richard F. Gallivan
Attorney, Agent, or Firm—G. A. Cone; Walter J. Jason; D. L. Royer

[57] ABSTRACT

This light modulating device comprises three subsystems: an electron gun which produces a scanning constant intensity electron beam, a liquid crystal cell, and an appropriate optical system to deliver light to and from the modulating effects of the liquid crystal cell. The modulation is accomplished by utilizing a scanning constant intensity electron beam to deposit electrical charge through a secondary emission process on the dark side of a dielectric mirror within the liquid crystal cell, the amount of charge deposited being dependent upon the video voltage at the transparent electrode of the cell which is applied in synchronism with the scanning electron beam. In this manner a charge distribution is written on the back of the dielectric mirror which now contains all of the information within the video signal. The electrical field arising from this charge distribution in turn modulates the birefringence across the nematic phase liquid crystal. Under appropriate electrical field conditions, the "twisted" nematic phase liquid crystal cell will reflect incident plane polarized light as eliptically polarized light constituting an "ON" state. This eliptically polarized light is then projected through an appropriate analyzer and on through further relay optics. In the "OFF" state incident plane polarized light is reflected from the cell as linearly polarized light and is blocked by the analyzer.

10 Claims, 3 Drawing Figures

ELECTRON ADDRESSED LIQUID CRYSTAL LIGHT VALVE

BACKGROUND OF THE INVENTION

1. Field of the Invention

This invention relates to light modulating devices. Still more particularly, this invention relates to constant intensity electron beam addressed nematic phase liquid crystal light valves operated in the reflective mode.

2. Description of the Prior Art

Light modulation devices are most commonly employed as dynamic real time displays. Whatever their form, they perform essentially the same function as a conventional cathode ray tube (CRT) and, consequently, compete for the same market. As a result, light valve design usually attempts to achieve improved resolution, higher brightness, and/or larger display size than that which can be achieved with a CRT.

The class of light valves involved herein is that of the electro-optic dynamic light valve which uses the electro-optic rotation of light polarization between crossed polarizers as a means for light modulation. Two different types are employed at this time. One type is the electron beam addressed light valve in which the electro-optical material is a $KD_2PO_4$ crystal, cooled to within a few degrees of its Curie point (minus 50° C.). The TITUS light valve manufactured by the Sodern Company is such a device. The second type of electro-optic dynamic light valve is the slower light beam addressed photoconductor-liquid crystal light valve which may be coupled to a fiber optic face plate CRT. Devices of this latter type have been developed by the Hughes Aircraft Company. Both devices are operated in the reflective mode.

The $KD_2PO_4$ light valve is of a somewhat complex construction. The deuterated crystal must be fastened to a cooling stage (in vacuum) in order that the crystal may be operated near its Curie point. The manufacture of the crystal itself is an involved process due to the extremely stringent crystal purity requirements over a large area, usually a few square centimeters. The crystal cell itself has a high capacitance and requires video driving voltages of the order of 150 volts.

The electron addressed liquid crystal light valve of the present invention incorporates the best characteristics of the two prior devices and, at the same time, avoids the less desirable features of these two prior art devices. The advantages of the instant device described herein below are that the liquid crystal cell is directly electron beam addressed, thus bypassing the need for a photo sensor. A liquid crystal cell requires no fiber optic coupling to a CRT face plate. The liquid crystal cell may be driven by a small video voltage (less than ten volts). The response time of the instant liquid crystal cell is more than adequate for TV frame rates. The instant device is also lightweight, requires no cooling devices, is much easier to fabricate, lacks visible raster lines, and possesses memory capability.

It is appropriate at this point to briefly discuss the properties of liquid crystals in general. In liquid or fluid substances, the molecules are typically randomly distributed and oriented throughout the mass. Conversely, in crystalline solids the molecules are typically rigidly oriented and arranged in a specific crystalline structure. Liquid crystals resemble solid crystals in that the molecules of the liquid crystalline substance are regularly oriented in a fashion analagous to but less extensive than the molecular orientation structure in a crystalline solid. It has been observed that many substances exhibit liquid crystalline characteristics only in a relatively narrow temperature range; below this temperature range these substances appear only as crystalline solids, and above the temperature range they appear only as liquids. Liquid crystals are known to appear in at least three different forms: the smectic, nematic, and cholesteric forms. These structural forms are sometimes referred to as mesophases, thereby indicating that they are states of matter intermediate between the liquid and crystal states.

In the smectic structure the molecules are arranged in layers with their major axis approximately parallel to each other and approximately normal to the planes of said layers. The attractive forces between layers are relatively weak so that the layers are free to move in relation to each other. In the nematic structure the major axis of the molecules lie approximately parallel to each other, but the molecules are not organized into different layers as in the smectic structure. In the cholesteric structure the molecules are believed to be arranged in definite layers as in the smectic structure; however, within a given layer, the molecules are believed to be arranged with their major axis approximately parallel in a fashion resembling the structure of the nematic liquid crystals. Because the major axis of the molecules in the cholesteric structure are believed to be parallel to the planes of the layers, the molecular layers are very thin. Prior art references disclose that cholesteric phase liquid crystals respond optically to the application of an electric field. Also, electrically induced phase changes from cholesteric to nematic have been utilized for light modulation.

SUMMARY OF THE INVENTION

This light modulating device comprises three subsystems: an electron gun which produces a scanning constant intensity electron beam, a liquid crystal cell, and an appropriate optical system to deliver light to and from the modulating effects of the liquid crystal cell.

The modulation within the liquid crystal cell is accomplished by utilizing a scanning constant intensity electron beam to deposit electrical charge through a secondary emission process on the dark side of a dielectric mirror within the liquid crystal cell, the amount of charge deposited being dependent upon the video voltage at the transparent electrode of the cell which is applied in synchronism with the scanning electron beam. In this manner a charge distribution is written on the back of the dielectric mirror which now contains all of the information within the video signal. The electrical field arising from this charge distribution in turn modulates the birefringence across the nematic phase liquid crystal. Under appropriate electrical field conditions, the liquid crystal cell will reflect incident plane polarized light as eliptically polarized light constituting an "ON" state. This eliptically polarized light is then projected through an appropriate analyzer and on through further relay optics. In the "OFF" state incident plane polarized light is reflected from the cell as linearly polarized light and is blocked by the analyzer.

The light valve itself is housed within an evacuated housing and comprises means for producing a focused scanning constant intensity electron beam; and a liquid crystal cell comprising a liquid crystal disposed between two parallel alignment surfaces, the alignment of one such surface being rotated relative to the other such surface, a thin optical flat having one surface as one of said alignment surfaces and the other surface as a dielectric mirror such that the dielectric mirror faces the electron beam producing means, a thin film of insulating material serving as the second alignment surface, a transparent electrode disposed adjacent to the thin film of insulating material, and a face plate disposed adjacent the transparent electrode. The light valve further comprises an effectively electron transparent electrode comprising a fine conducting mesh disposed parallel to and spaced from about one to about fifty microns from the dielectric mirror and a circuit means to impress a video signal between the transparent electrode and the electron transparent electrode in synchronization with the electron beam producing means

DETAILED DESCRIPTION OF THE INVENTION

Figure 1:
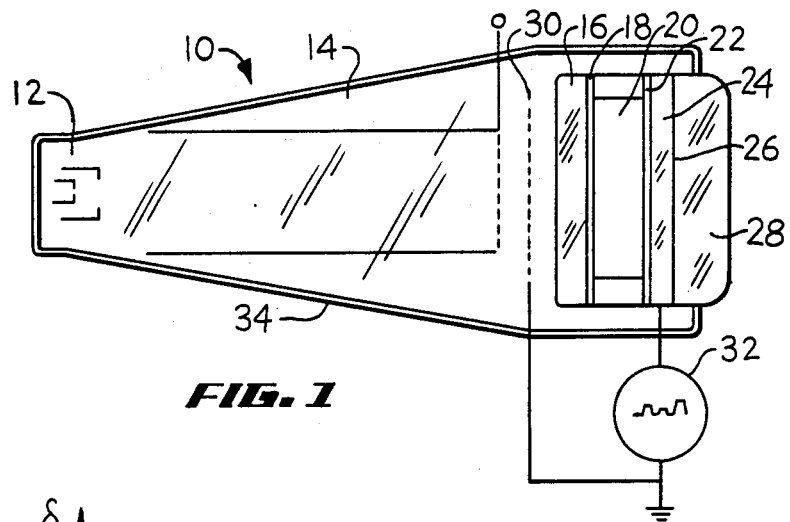
FIG. 1 is a cross-sectional view of the electron-addressed liquid crystal light valve.

The light modulating device disclosed herein comprises three subsystems: a means for producing a scanning focused electron beam, a liquid crystal cell, and appropriate optical means for accessing the liquid crystal cell in a reflective mode. The operation of the electron beam producing means is rather straightforward. The electron optics involved herein are essentially those of a scanning constant intensity electron beam (no Z modulation) CRT. The electrons originating from the thermionic cathode should be accelerated through a potential difference of about 500 to about 1,000 volts, beam intensity being of the order of 50 microamps. Referring to FIG. 1 of the drawings, the electron gun 12 and electron optics 14 are shown.

Figure 2:
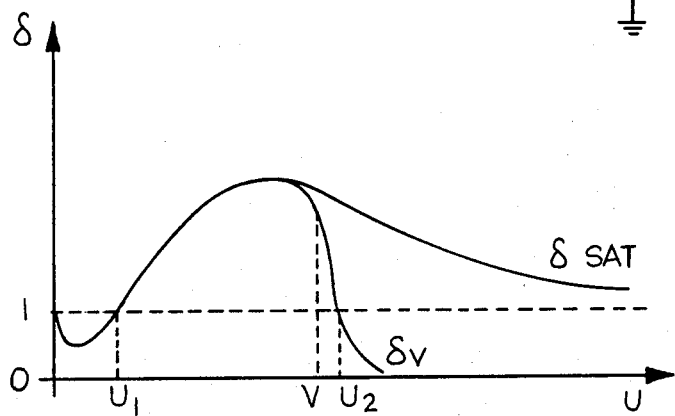
FIG. 2 is a graph which depicts the secondary emission ratio of a dielectric target ($\delta$) as a function of the accelerating voltage (U).

The constant intensity electron beam which is scanned across the dielectric mirror 16 makes use of the secondary electron emission characteristics of dielectrics in general. FIG. 2 is a generalized graph showing the secondary emission ratio of a dielectric target as a function of accellerating voltage, U, of the incident electrons. $\delta_{SAT}$ is obtained when the anode potential is maintained higher than the dielectric target potential, and $\delta_V$ is obtained when the anode potential V falls between the potential $U_1$ and $U_2$ for which $\delta_V$ equals one. Referring again to FIG. 1, a very fine mesh 30 of appropriate electron transparency is placed a few microns from the dielectric surface 16. For an operating, V, voltage between $U_1$ and $U_2$ ($\delta_V$ greater than one), the electron beam can stablize the dielectric target surface potential with the same value as the grid. This effectively causes the electron beam to act as a flying short circuit "to ground." As a result, the instantaneous video voltage from the video signal input 32 is applied locally through the dielectric sandwich. The local instantaneous charge remains in place until the next scan of the electron beam.

As discussed above, the electrical field arising from the above charge distribution in turn modulates the birefringence across the liquid crystal. The liquid crystal itself is a mixture which exhibits the nematic phase in the temperature range of interest. The one particular liquid crystal utilized possessed a temperature range of from about $-8°$ C. to about 60° C. with positive dielectric anisotropy ($\Delta\epsilon = +11$), although other mixtures could be used as well.

The liquid crystal cell comprises a number of thin film layers sandwiched between the dielectric mirror 16 and the glass face plate 28. The side of the face plate whose normal is towards the liquid crystal material is optically flat to about a quarter of a wave length quality. A thin film of tin doped indium oxide approximately 15 microns thick is sputtered onto the flat surface to serve as the transparent electrode 24 which is in turn coupled to the video signal input 32. A thin film of silica dioxide about 3,000 Angstroms thick is deposited on the transparent electrode 24 to isolate the liquid crystal from the transparent electrode and to serve as a liquid crystal alignment film 22. The liquid crystal layer itself 20 is about three microns thick.

On the other side of the liquid crystal layer 20 is the dielectric mirror 16 which has been deposited on a thin rectangular optical flat with faces parallel to fractions of a second and of equal thickness to one quarter wavelength. The thickness of this glass substrate is adjusted in order to obtain a working tradeoff between mechanical stability, system resolution, and capacitance of the cell. The dielectric mirror comprises a set of interference layers made of alternate low-high refractive index dielectric materials, the indices of refraction and thicknesses of which determine which light wavelengths will be reflected and which will be transmitted. The side of the thin glass plate towards the liquid crystal is previously treated in order to serve as a crystal alignment film 18. The entire liquid crystal cell is sealed and made vacuum compatible. The mechanical pretreatment of the surfaces 18 and 22 facing the liquid crystal 20 is done such that the preferred alignment direction on one film is aligned at approximately 45° to the preferred alignment direction on the other film.

The angularly offset orientation of the two alignment surfaces 18 and 22 provides for maximum contrast during the operation of cell and creates a "twisted nematic cell." Due to the presence of wall forces, the liquid crystal molecules near the alignment surfaces will align themselves with their longitudinal molecular axes parallel to the preferred directions; when the initial alignment is in the zero degree orientation, the subsequent layers of molecules will twist until the other alignment surface mounting the liquid crystal is reached, whereupon the liquid crystal molecules will have attained the orientation of the second alignment surface in the 45° orientation.

As discussed earlier, the operation of this device depends in part on the electro-optic rotation of light polarization between crossed polarizers as the means for light modulation. In the absence of an electrical field, if plane polarized light enters the cell with its plane of polarization coinciding with the alignment direction of the alignment film 22, the polarization vector will twist through an angle of 45°, be reflected by the dielectric mirror 16, return through the liquid crystal untwisting, and emerge with the same plane of polarization as that of the incident polarized light. This is the twisted nematic effect. An analyzer with its polarizing axis at right angles to this plane will not allow the transmission of this light, and the system will appear dark. This is the "OFF" state.

The application of an electrical field normal to the planes surfaces will tend to make the longitudinal molecular axis align with the direction of the field. For sufficient field strength, all the molecules in the liquid crystal will align themselves with the direction of the field. Incident plane polarized light will not change its plane of polarization as it is reflected from the dielectric mirror 16, and again an "OFF" state exists. By decreasing the voltage, however, there exists a voltage interval at which the twist of the molecules will be broken. Roughly half the molecules, those next to the alignment surface at 18 of the dielectric mirror 16, retain a 45° alignment with the rest of the molecules remaining in the zero degree alignment corresponding to the alignment surface 22 next to the transparent electrode 24. Plane polarized light incident on the cell will now emerge as elliptically polarized light and will be transmitted through the analyzer. This constitutes the "ON" state. Power consumption in the cell is very small, being generally less than about fifty microwatts per square centimeter. The working surface of the cell is approximately one square inch.

Figure 3:
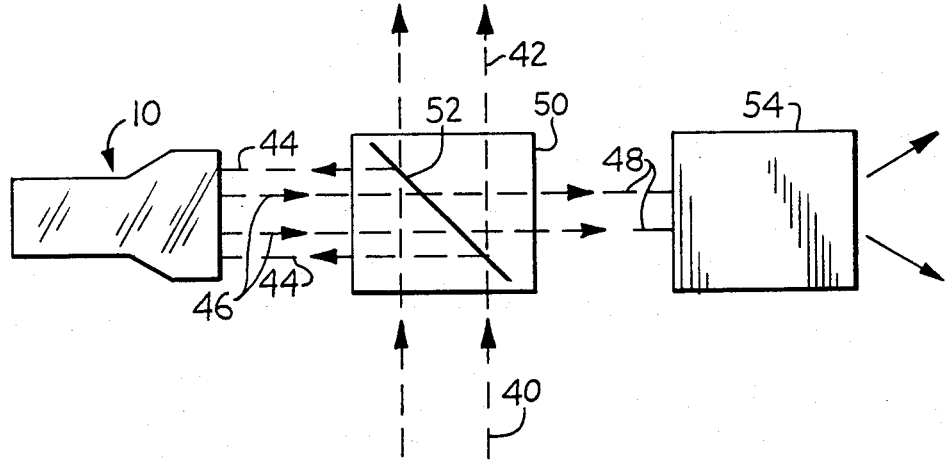
FIG. 3 is a schematic diagram of a light modulating system employing the electron-addressed liquid crystal light valve.

The third element of the light modulated system comprises a means for inputting and collecting light from the modulating effects of the electron addressed liquid crystal light valve itself. Many such means are possible; however, probably the most common would be a television-like display as shown in FIG. 3. Incident light 40 is produced from a non-polarized light source not shown. The polarizing beam splitter 50 serves as both the initial polarizer and the analyzer. As the incident light 40 enters the polarizing beam splitter 50, plane polarized light of the preferred direction 44 is reflected by the polarizing mirror 52 towards the electron addressed liquid crystal light valve 10 while the remainder of the incident light 42 exits the polarizing beam splitter 50. The light which is reflected and modulated 46 by the action of the electron addressed liquid crystal light valve 10 re-enters the polarizing beam splitter 50 where it is acted upon by the polarizing mirror 52. The light which passes through the polarizing mirror contains only that information corresponding to the "ON" state of the electron addressed liquid crystal light valve. This modulated light 48 then enters a suitable optical relay or projection optics 54 for either direct viewing or further processing.

It should be noted that color capability is inherent in the operation of this light modulation system. A full color light valve light modulation system may be achieved by the use of three monochrome electron addressed light valve tubes, each valve operation in the red, green, and blue portions of visible spectrum respectively. The color at which each light valve is operated is accomplished by adjusting the thickness of the individual liquid crystals within each liquid crystal cell, the design of the dielectric mirror with each cell, and the use of light filters.

Although this system has been described in reference to a television-like application, it is immediately apparent that its usage would not be limited thereto. Other applications could include entertainment devices, large scale display systems, teaching aids, and any of the host of applications to which conventional cathode ray tubes are suited. Specific applications also include flight simulation usages such as computer generated background image projection, target projection, and aircraft Head-Up Display systems. Another capability inherent in this device is the modulation of coherent laser light with an electrical signal. Such an electro-optical converter would have application in a large number of areas including: holographic optical memories, Fourier transform recording, microfiche, data storage and retrieval, optical character recognition, pattern recognition, speech recognition, page readers, fingerprint analysis, real time spectral analysis, map matching guidance systems, and other applications of matched filter correlation and optical data processing which employ the unique properties of monochromatic laser light.

We claim:

1. A light valve comprising:
    means for producing a focused scanning electron beam;
    a liquid crystal cell comprising:
        a liquid crystal disposed between two parallel alignment surfaces, the alignment of one such surface being rotated relative to the other such surface,
        a thin optical flat having one surface as one of said alignment sufaces and the other surface as a dielectric mirror such that the dielectric mirror faces the electron beam producing means;
        a thin film of insulating material serving as the second alignment surface
        a transparent electrode disposed adjacent to the thin film of insulating material, and
        a faceplate disposed adjacent the transparent electrode;
    an effectively electron-transparent electrode comprising a fine conducting mesh disposed parallel to and spaced from about one to about 50 microns from the dielectric mirror; and
    circuit means to apply a video signal between the transparent electrode and the electron transparent electrode in synchronization with the electron beam producing means.

2. The light valve of claim 1 further comprising a housing means suitable for maintaining the elements of the light valve in an evacuated environment.

3. The light valve of claim 1 wherein the one alignment surface is rotated approximately 45° relative to the other alignment surface.

4. The light valve of claim 1 wherein the liquid crystal comprises a nematic phase liquid crystal.

5. A light modulation system comprising:
    a light source optically linked to a first polarizing filter which transmits plane polarized light from the light source onto an electron-addressed liquid crystal light valve, said plane polarized light entering into the light valve, being reflected therefrom, and finally transmitted through a second polarizing filter the plane of polarization of which is rotated about 90° relative to the plane of polarization of the first polarizing filter wherein the light valve comprises:
        a liquid crystal disposed between two parallel alignment surfaces, the alignment of one such surface being rotated relative to the other such surface;
        a thin optical flat having one surface as one of said alignment surfaces and the other surface as a dielectric mirror such that the dielectric mirror faces the electron beam producing means;
        a thin film of insulating material serving as the second alignment surface;
        a transparent electrode disposed adjacent to the thin film of insulating material; and a faceplate disposed adjacent the transparent electrode;

an effectively electron-transparent electrode comprising a fine conducting mesh disposed parallel to and spaced from about one to about 50 microns from the dielectric mirror; and a circuit means to apply a video signal between the transparent electrode and the electron transparent electrode in synchronization with the electron beam producing means.

6. A light modulation system comprising:

a light source optically linked to a polarizing beam splitter means which transmits plain polarized light on to an electron addressed liquid crystal light valve; said plain polarized light entering into the light valve, being reflected therefrom, and finally transmitted from the polarizing beam splitter wherein the light valve comprises:

a liquid crystal disposed between two parallel alignment surfaces, the alignment of one such surface being rotated relative to the other such surface;

a thin optical flat having one surface as one of said alignment surfaces and the other surface as a dielectric mirror such that the dielectric mirror faces the electron beam producing means;

a thin film of insulating material serving as the second alignment surface;

a transparent electrode disposed adjacent to the thin film of insulating material; and a faceplate disposed adjacent to the transparent electrode;

an effective electron-transparent electrode comprising a fine conducting mesh disposed parallel to and spaced from about one to about 50 microns from the dielectric mirror; and a circuit means to apply a video signal between the transparent electrode and the electron transparent electrode in synchronization with the electron beam producing means.

7. The system of claim 5 or claim 6 wherein the finally transmitted light is optically connected to projection optics means.

8. The system of claim 5 or claim 6 wherein the light valve further comprises a housing means suitable for maintaining the elements of the light valve in an evacuated environment.

9. The system of claim 5 or claim 6 wherein the light valve is constructed such that one alignment surface is rotated approximately 45° relative to the other alignment surface.

10. The system of claim 5 or claim 6 wherein the light valve is constructed such that the liquid crystal comprises a nematic phase liquid crystal.

* * * * *